United States Patent [19]

Tani

[11] Patent Number: 5,339,162
[45] Date of Patent: Aug. 16, 1994

[54] DRIVING APPARATUS OF IMAGE PICK-UP DEVICE FOR PREVENTING LEAKAGE OF ACCUMULATED ELECTRICAL CHARGES

[75] Inventor: Nobuhiro Tani, Tokyo, Japan

[73] Assignee: Asahi Kogaku Kogyo Kabushiki Kaisha, Tokyo, Japan

[21] Appl. No.: 51,809

[22] Filed: Apr. 26, 1993

Related U.S. Application Data

[63] Continuation of Ser. No. 561,718, Aug. 1, 1990, abandoned.

[30] Foreign Application Priority Data

Aug. 8, 1989 [JP] Japan .................. 1-206245

[51] Int. Cl.[5] ........................................... H04N 5/335
[52] U.S. Cl. ........................... 348/298; 348/250
[58] Field of Search ............... 358/213.11, 213.19, 358/213.15, 213.22, 213.24, 213.26, 209, 216; H04N 5/335, 3/14

[56] References Cited

U.S. PATENT DOCUMENTS

| | | | |
|---|---|---|---|
| 4,032,976 | 6/1977 | Levine | 358/213.24 |
| 4,626,915 | 12/1986 | Takatsu | 358/213.15 |
| 4,783,702 | 11/1988 | Sone et al. | 358/213.19 |
| 4,845,566 | 7/1989 | Sakai et al. | 358/213.24 |
| 4,875,101 | 10/1989 | Endo et al. | 358/213.19 |
| 4,975,777 | 12/1990 | Lee et al. | 358/213.19 |

FOREIGN PATENT DOCUMENTS

| | | | |
|---|---|---|---|
| 0026904 | 4/1981 | European Pat. Off. | H04N 3/15 |
| 0083376 | 7/1983 | European Pat. Off. | H04N 5/30 |
| 0265271 | 4/1988 | European Pat. Off. | H04N 3/15 |
| 0365000 | 4/1990 | European Pat. Off. | H04N 3/15 |
| 2640836 | 6/1990 | France | H04N 3/15 |

Primary Examiner—Joseph Mancuso
Assistant Examiner—Tuan V. Ho
Attorney, Agent, or Firm—Sandler Greenblum & Bernstein

[57] ABSTRACT

An image pick-up device driving apparatus including an image pick-up device having a light receiver which converts an image of an object to be taken to electrical signal charges to be accumulated, and a signal transfer device which transfers the accumulated signal charges, and a controller for controlling the image pick-up device to prevent unnecessary electrical charges accumulated by the light receiver from leaking into the signal transfer device before the electrical charges accumulated in the light receiver and transferred to the signal transfer device are read.

8 Claims, 13 Drawing Sheets

(PRIOR ART)

DRIVING APPARATUS OF IMAGE PICK-UP DEVICE FOR PREVENTING LEAKAGE OF ACCUMULATED ELECTRICAL CHARGES

This application is a continuation of U.S. application Ser. No. 07/561,718, filed Aug. 1, 1990, now abandoned.

BACKGROUND OF THE INVENTION

1. Field of the Invention

The present invention relates to a driving apparatus of an image pick-up device which can be advantageously used in an electronic still camera.

2. Description of the Related Art

In FIG. 11 which shows a block diagram of a known electronic still camera, a lens 1 forms an image by receiving light from an object (not shown) to be captured on a CCD 3 through a diaphragm 2. A record/playback portion 4 modulates picture signals (luminance signal and color signal) output from the CCD 3 to record it on a magnetic disc 5.

A photometering element 6 receives light from the object to output electrical signals to a photometering portion 7. The output of the photometering portion 7 is sent to a micro processing unit (MPU) 8. A release switch 9 is actuated to take a picture. A clock generator 10 for driving the CCD 3 is controlled by the MPU 8 to output clock signals CV1~CV4 for driving the CCD 3 and various timing signals. A multiplexer 11 selects one of the clock signals PV1~PV4 from the MPU 8 and the clock signals CV1~CV4 from the clock generator 10 to output clock signals V1~V4.

A driver 12 produces clock signals $\Phi V1 \sim \Phi V4$ for driving the CCD 3 from the clock signals V1~V4 input thereto from the multiplexer 11. One of a transfer clock signal CTG output from the clock generator 10 and a compulsive transfer clock signal PTG output from the MPU 8 is selected by an accumulation control selecting switch 13 to output it to the driver 12. The diaphragm 2 is controlled to open and close by a driving circuit 14.

The image pick-up operation of the electronic still camera mentioned above is as follows (FIGS. 12 and 13). The image pick-up operation is generally controlled by the MPU 8.

When the release switch 9 is made ON, the signal from the photometering element 6 is detected by the photometering portion 9 to output a signal corresponding to the luminance of the object to the MPU 8. The MPU 8 performs an arithmetic operation to obtain a numerical aperture Av and electronic shutter speed (period) Tv in accordance with the signal input thereto from the photometering portion 7, as shown at (a) and (c) in FIG. 12.

The timing generator 10 periodically outputs the clock signals CTG (FIG. 12(k)) at 1/60 second interval, in synchronization with the vertical synchronous signal VD (FIG. 12(b)). The MPU 8 outputs the switching signal Ps (FIG. 12(h)) of logic "H", and accordingly, the selecting switch 13 connects the terminal of the signal CTG to the terminal of the driver 12, so that the signal CTG is supplied to the driver 12 (FIG. 12(d)). The multiplexer 11 selects the clock signals CV1~CV4 output from the clock generator 10 to output the clock signals V1~V4 to the driver 11 when the switching signal Ps is logic "H".

The driver 12 produces clock signals $\Phi V1 \sim \Phi V4$ (FIG. 13(f)~(i)) for driving the CCD 3 in accordance with the clock signals V1~V4 and the clock signal TG (or CTG or PTG) (FIGS. 13(a)~(e)).

The clock signals $\Phi V1 \sim \Phi V4$ consist of three-valued levels VH, VM and VL. When the clock signals are level VH, the electrical charges are transferred to the vertical transfer CCD's from photo diodes which constitute the CCD 3. When the clock signals are level VM or VL, the charges of the vertical transfer CCD's are transferred to the horizontal transfer CCD or a sweeping drain. The direction of the transfer is controlled by the phase of the clock signals $\Phi V1 \sim \Phi V4$.

Thus, the unnecessary charges which are accumulated in the period TVn are transferred to the vertical transfer CCD's in accordance with the clock signal CTG, and are then swept therefrom through the sweeping drain in accordance with the clock signals $\Phi V1 \sim \Phi V4$, as shown in FIG. 12(d).

The MPU 8 controls the drive circuit 14 to open the diaphragm 2 at a predetermined numerical aperture obtained thereby (FIG. 12(e)).

Upon the completion of the sweeping of unnecessary charges and the setting of the diaphragm 2, the signal Ps is inverted to logic "L", in synchronization with the vertical synchronous signal, as shown in FIG. 12(h). As a result, the multiplexer 11 selects the clock signals PV1~PV4 from the MPU 8 to output it to the driver 12. The selection switch 13 is switched to connect to the terminal of the driver 12 to the terminal of the signal PTG. The MPU 8 generates the clock signal PTG at a time in which the interval of the two adjacent clock signals CTG is identical to the arithmetically obtained period Tv, as shown in FIGS. 12(d) and (j).

The charges accumulated in the photo diodes of the CCD 3 are transferred to the vertical transfer CCD's and thereafter, the charges corresponding to the quantity of light of the object are accumulated during the period Tv.

The MPU 8 inverts the signal Ps to logic "H" during the period Tv synchronously with the vertical synchronous signal in the period Tv to output the signal PVH to the clock generator 10, to thereby output the high speed sweeping clock signals CV1~CV4. As a result, the unnecessary charges which are transferred to the vertical transfer CCD's and which are accumulated during the period Tvn+1 are swept through the sweeping drain at a high speed (FIG. 12(d)).

Upon the completion of the high speed sweeping, the charges of the photo diodes are transferred to the vertical transfer CCD's in accordance with the clock signal CTG. The signal Ps is again inverted to "L", as shown in FIG. 12(h). Then, the diaphragm 2 is driven to close (FIG. 12(e)). Consequently, relatively intensive light is incident upon the CCD 3 after the lapse of the period Tv, so that the charges produced by the photo diodes leak out into the vertical transfer CCD's 3 to prevent the occurrence of smear.

After the diaphragm 2 is closed, the signal REC is output from the MPU 8 to the record/play-back portion 4 and the magnetic disc 5. Also, the signal Ps becomes "H", and the signal PHV becomes "L", respectively (FIGS. 12(f), (h) and (i)). Consequently, the clock signal CV1~CV4 are output again from the clock generator 10 at low speed, so that the signals are read from the vertical transfer CCD's through the horizontal transfer CCD to be supplied to the record/play-back portion 4. Thereafter, the record/play-back portion 4 performs an FM-modulation of the signals to output the modulated signals to the magnetic disc 5 to be recorded, as shown in FIGS. 12(d), (f) and (g).

As can be seen from the foregoing, since the charges which are accumulated during the operation of the electronic shutter are transferred and read when the diaphragm 2 is closed, no smear occurs.

However, if a relatively intensive light is incident before the diaphragm 2 is closed, the charges overflow from the photodiode into other photodiode or the vertical transfer CCD's, so that a so-called blooming phenomenon occurs, as shown in FIG. 14.

SUMMARY OF THE INVENTION

The primary object of the present invention is to prevent the blooming phenomenon.

To achieve the object mentioned above, according to the present invention, there is provided an image pick-up device driving apparatus comprising an image pick-up device having a light receiver which converts an image of an object to be taken to electrical signal charges to be accumulated, and a signal transfer device which transfers the accumulated signal charges, and a control means for controlling the image pick-up device to prevent unnecessary electrical charges accumulated by the light receiver from leaking into the signal transfer device before the electrical charges accumulated in the light receiver and transferred to the signal transfer device are read.

With this arrangement, the electrical charges which are accumulated by the charge accumulating device (light receiver), such as photo diodes are not discharged into the signal transfer device, such as CCD, before the accumulated charges are read through the signal transfer device, and accordingly, no blooming occurs.

According to another aspect of the present invention, there is provided an image pick-up device comprising a light receiver which converts an image of an object to be taken to electrical signal charges to be accumulated, a signal transfer portion which transfers the signal charges accumulated in the light receiver, and a signal sweeping portion through which the electrical charges accumulated in the light receiver are directly swept.

BRIEF DESCRIPTION OF THE DRAWINGS

The invention will be described below in detail with reference to the accompanying drawings, in which.

DESCRIPTION OF THE PREFERRED EMBODIMENTS

Figure 1:
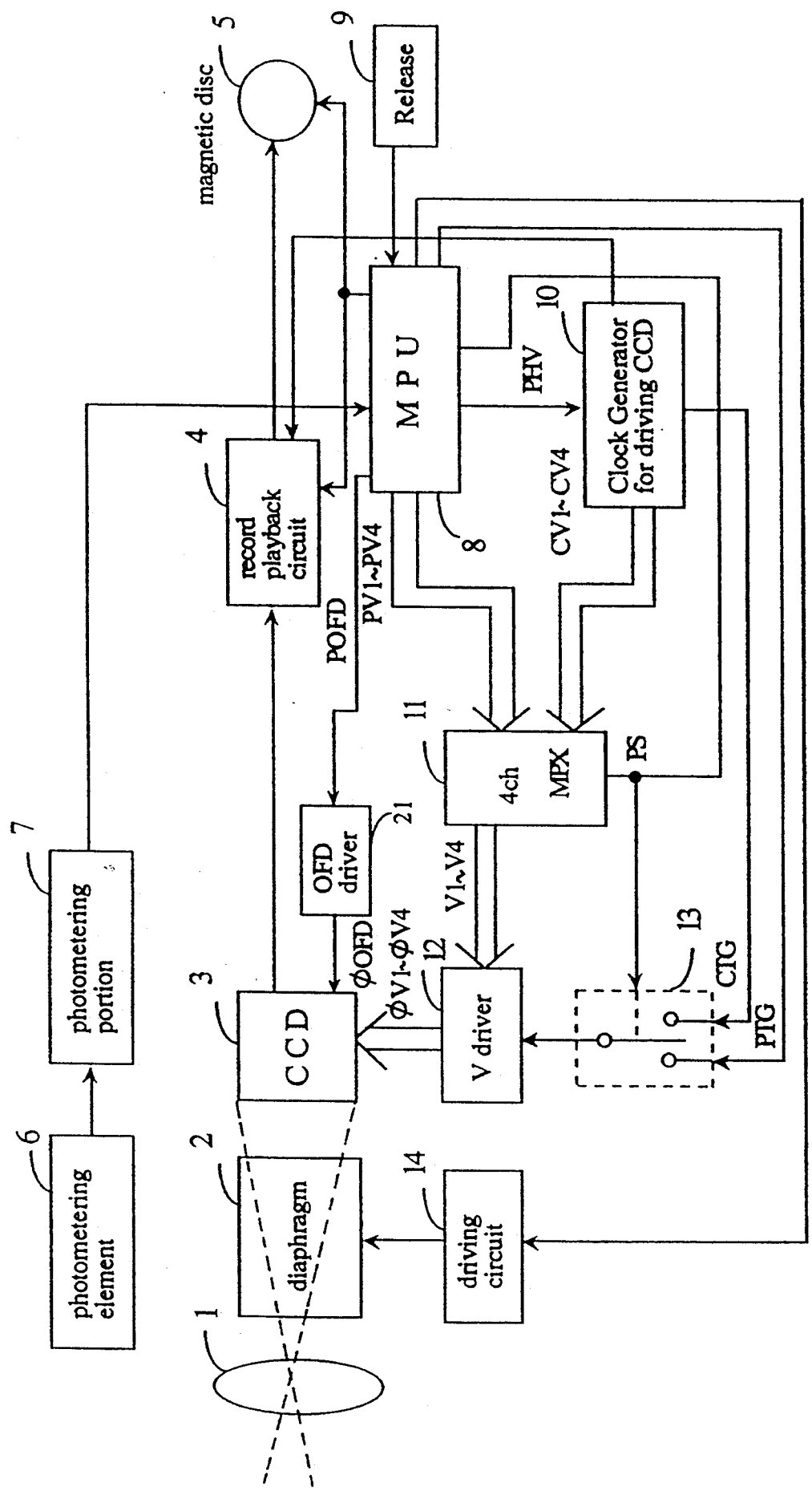
FIG. 1 is a block diagram of an electronic still camera which has therein a driving apparatus of an image pick-up device according to an embodiment of the present invention.
Figure 11:
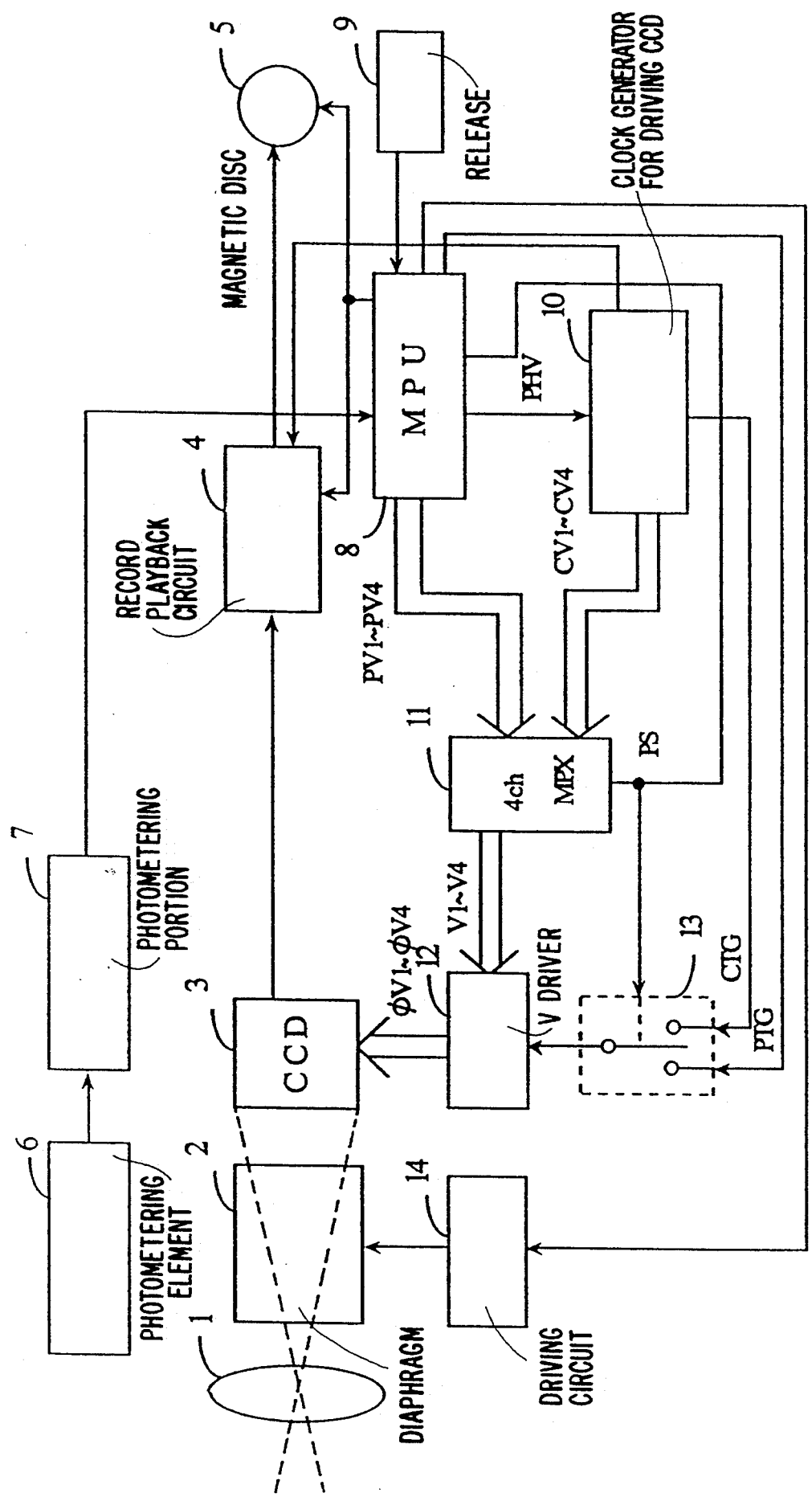
FIG. 11 is a block diagram of the main components of a known electronic still camera having an image pick-up device driving apparatus, according to the prior art.
Figure 12:
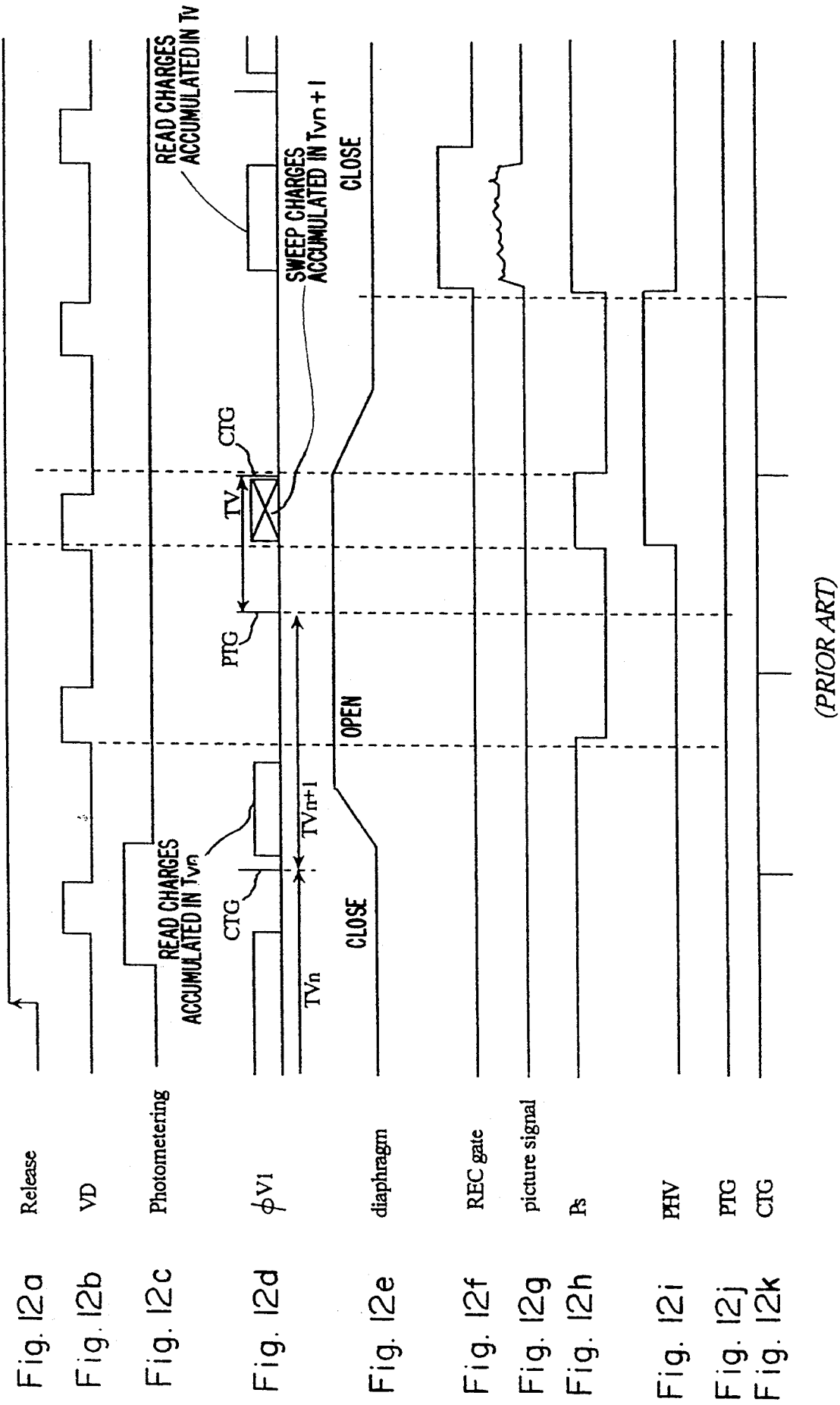
FIGS. 12a–12k and 13a–13i are timing charts of the operations of a known electronic still camera shown in FIG. 11; and, FIG. 14 is a schematic view showing the blooming phenomenon which occurs in a known electronic still camera.
Figure 13:
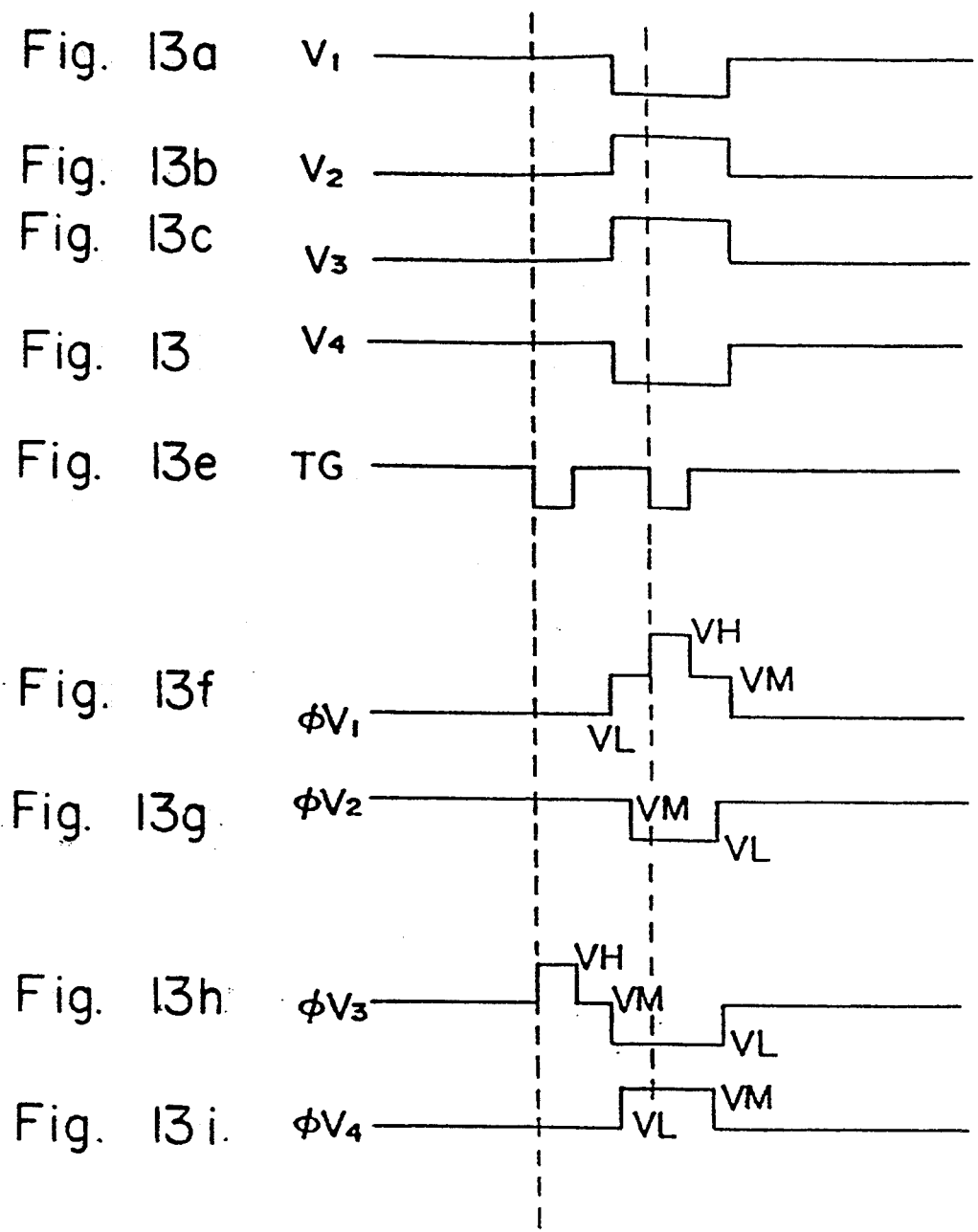
Figure 14:
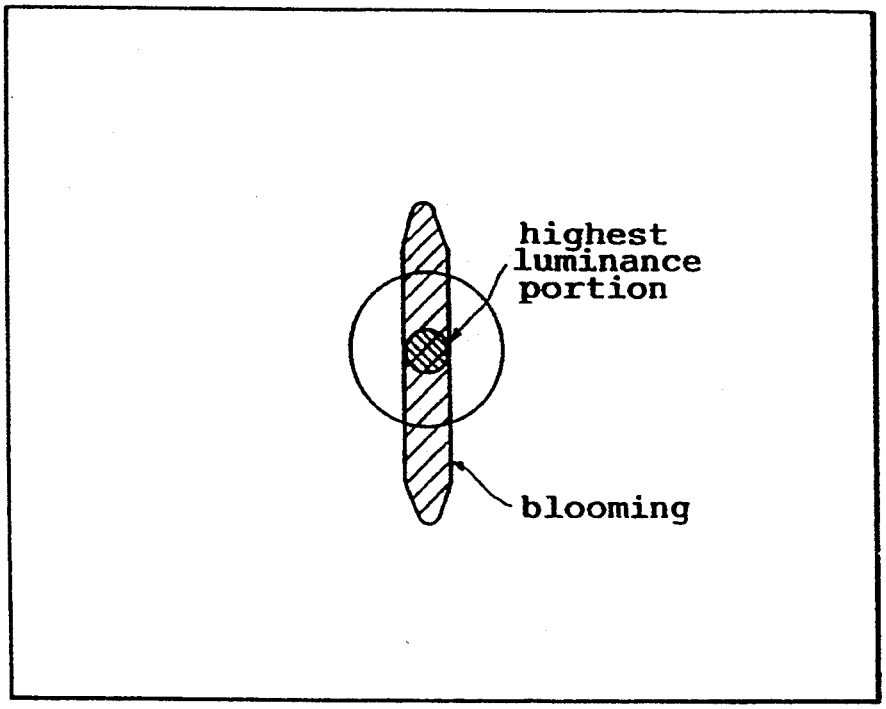

In FIG. 1 which shows a first embodiment of a driving apparatus of an image pick-up device according to the present invention, the components corresponding to those of FIG. 11 are designated with the same reference numerals.

A driver 21 outputs the signal ΦOFD corresponding to the signal POFD from the MPU 8 to the CCD 3. The other construction shown in FIG. 1 is same as that of FIG. 11.

Figure 2:
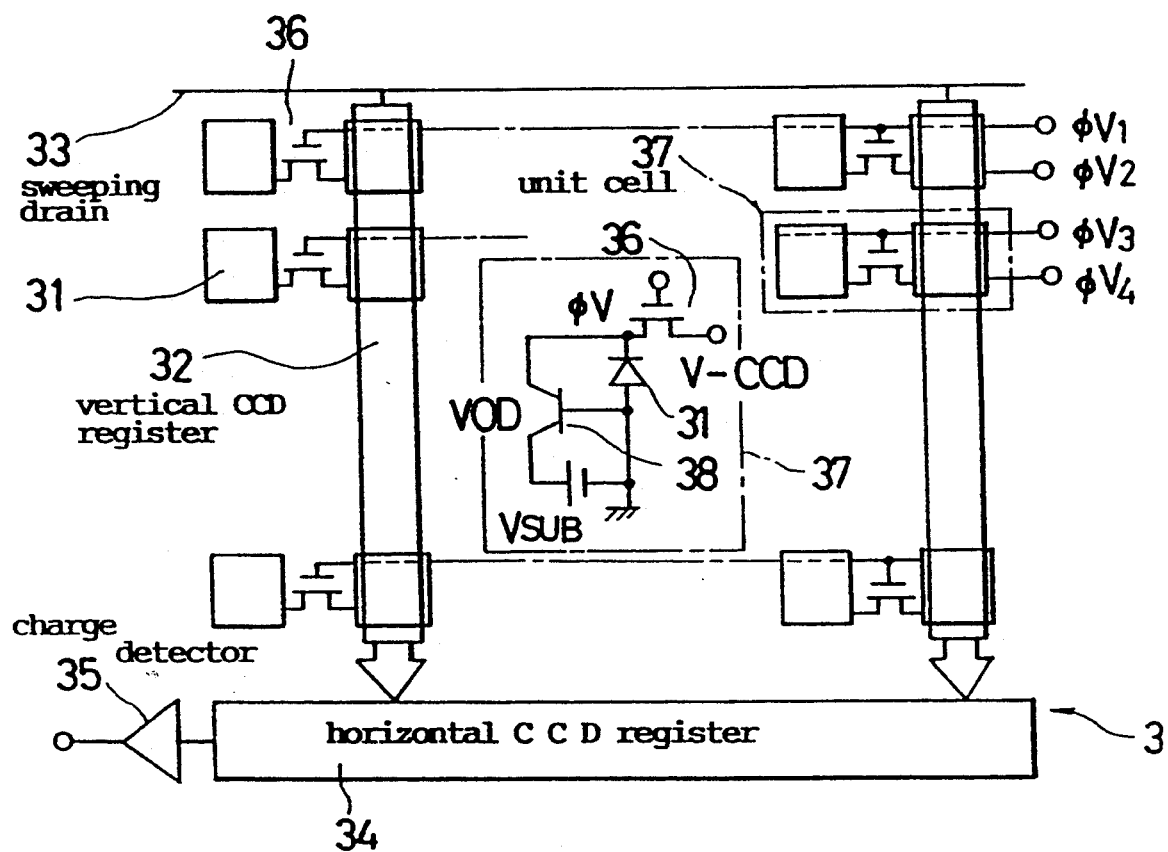
FIGS. 2 and 3 are a schematic plan view and a sectional view of a CCD image pick-up device shown in FIG. 1.

In FIG. 2, numeral 31 designates photo diodes which constitute picture elements in a matrix arrangement, and numeral 32 designates vertical transfer CCD's (vertical CCD registers) which transfer the charges transferred through respective transfer gates (switching elements) 36 from the associated photo diodes 31 to the sweeping drain 33 or the horizontal transfer CCD (horizontal CCD register) 34. Numeral 35 designates a charge detector which output the charges read from the horizontal transfer CCD's 34 as a voltage signal. The photo diodes 31, the vertical transfer CCD's 32, etc. are formed on a same IC substrate (integrated circuit board).

Figure 3:
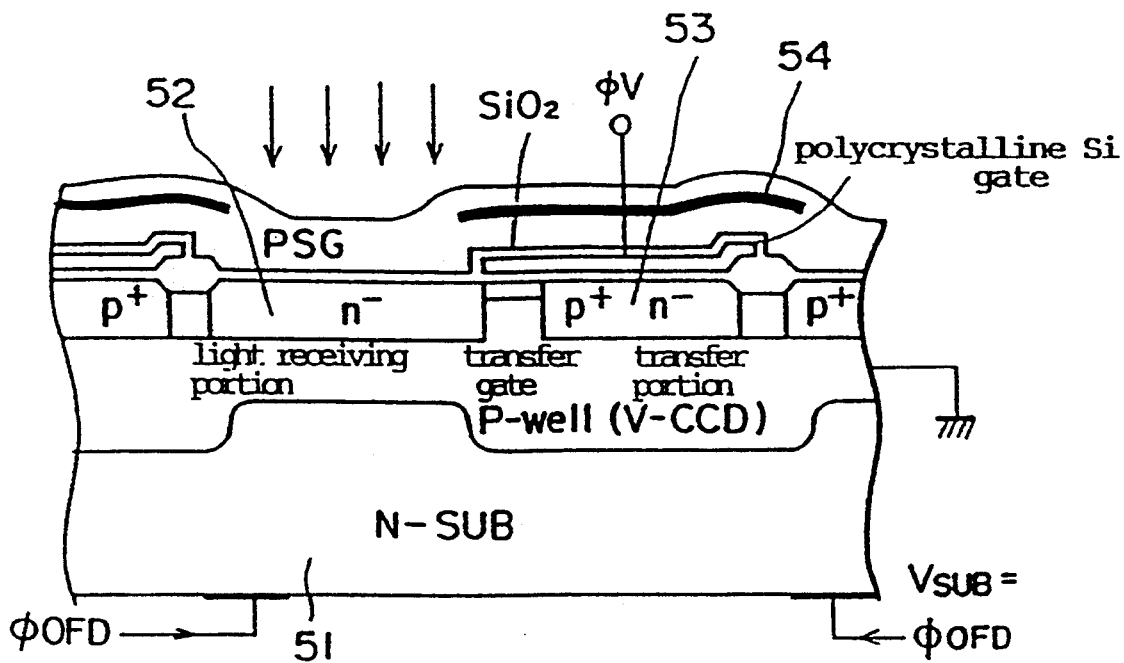

Each unit cell 37 has one photodiode 31 and a VOD 38 to which a predetermined voltage VSUB is applied. In FIG. 3, numeral 51 designates an n-type substrate (N-SUB) on which the photo diodes 31 are formed between the P-well and the n-layer 52. The vertical transfer CCD's 32 are formed by metal (Si) electrodes, an oxide layer SiO$_2$, the n-layer 52 and the P-well. Numeral 54 designates interception plates of aluminium which prevent light from being incident upon the vertical transfer CCD's 32.

On the rear surface of the substrate 51 are provided overflow gates ΦOFD which are located below one end of the photo diodes 31. The overflow gates ΦOFD serve as sweeping gates which sweep the unnecessary charges accumulated in the photo diodes 31 into the substrate 51.

Figure 4:
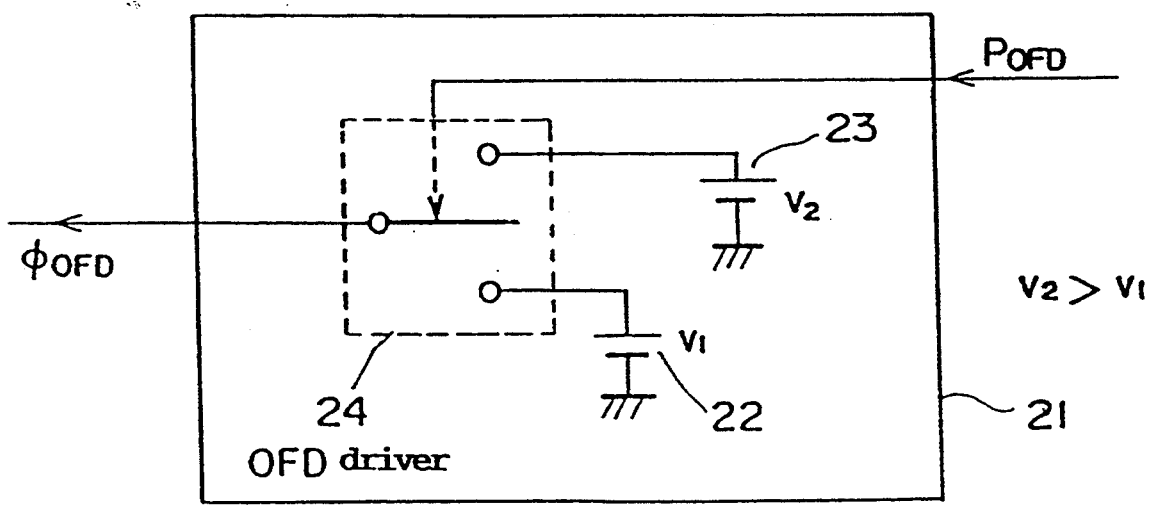
FIG. 4 is a block diagram showing a driver of a CCD image pick-up device driving apparatus shown in FIGS. 2 and 3, respectively.

In FIG. 4 which shows a block diagram of a driver 21 by way of example, numerals 22 and 23 designate voltage circuits which supply predetermined voltages V1 and V2 which are selected by a voltage selecting circuit 24.

Figure 5:
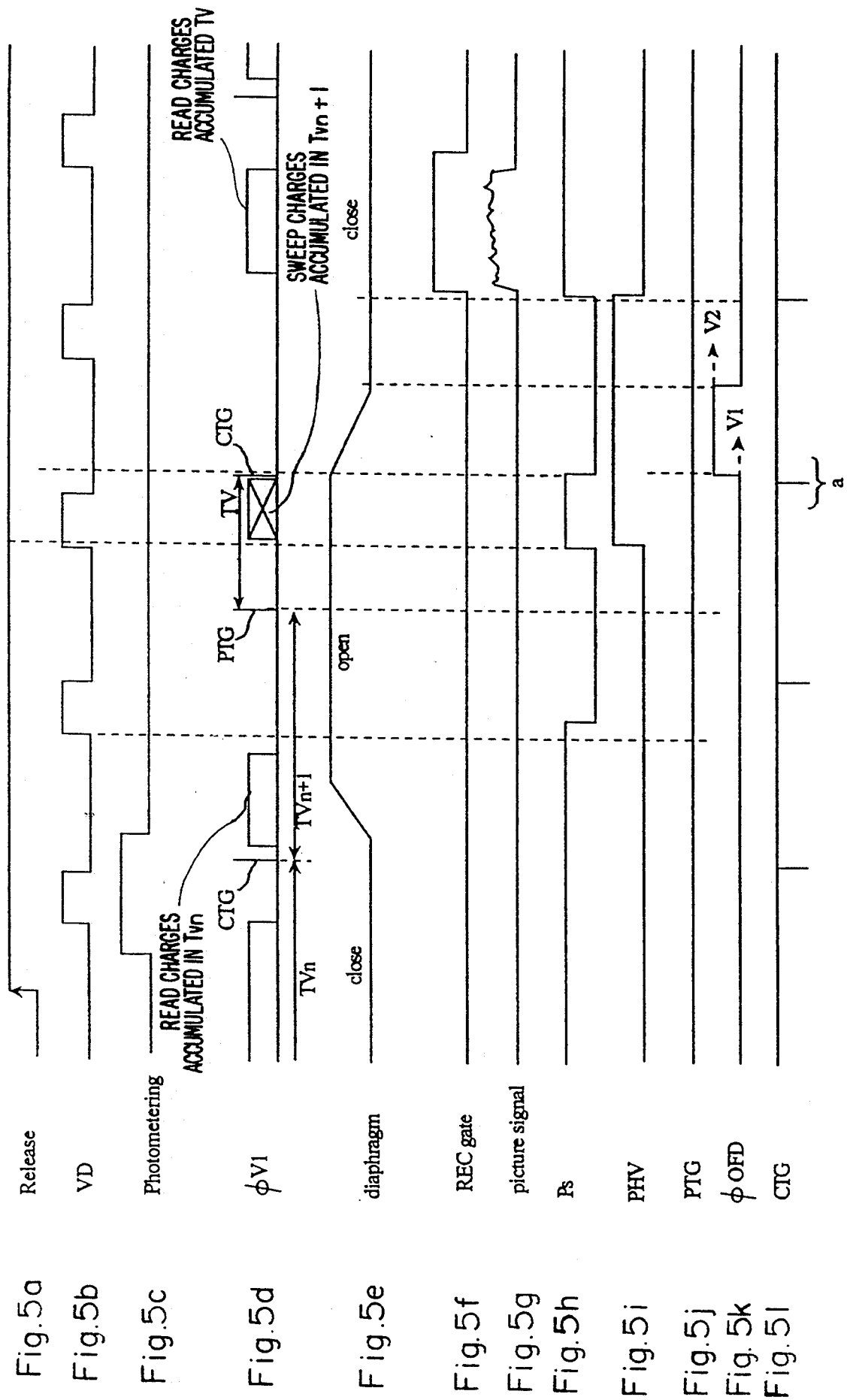
FIGS. 5a–5e and 6a–6c are timing charts of the operations of main components of an electronic still camera shown in FIG. 1.

The apparatus of the invention operates as follows (FIG. 5).

When the release switch 9 is made ON, the charges corresponding to an object image are accumulated by the photo diodes 31 and are then transferred to the vertical transfer CCD's 32, these CCDs are the same as those mentioned above (FIG. 5(a)~(e), (h)~(j) and (l)).

When the transfer clock signal CTG is output from the timing generator 10 to complete the electronic shutter operation, the MPU 8 as a control means controls the driving circuit 14 to close the diaphragm 2, so that the signal POFD to be output to the driver 21 is inverted for example from level "L" to level "H". When the signal POFD is inverted from level "L" to level "H", the switch 24 (FIG. 4) of the driver 21 is switched to connect the second voltage circuit 23 to the terminal of the signal ΦOFD, i.e. the CCD 3. As a result, the overflow signal ΦOFD output from the driver 21 is switched from the low voltage V1 to the high voltage V2 (FIG. 5(k)).

Figure 6:
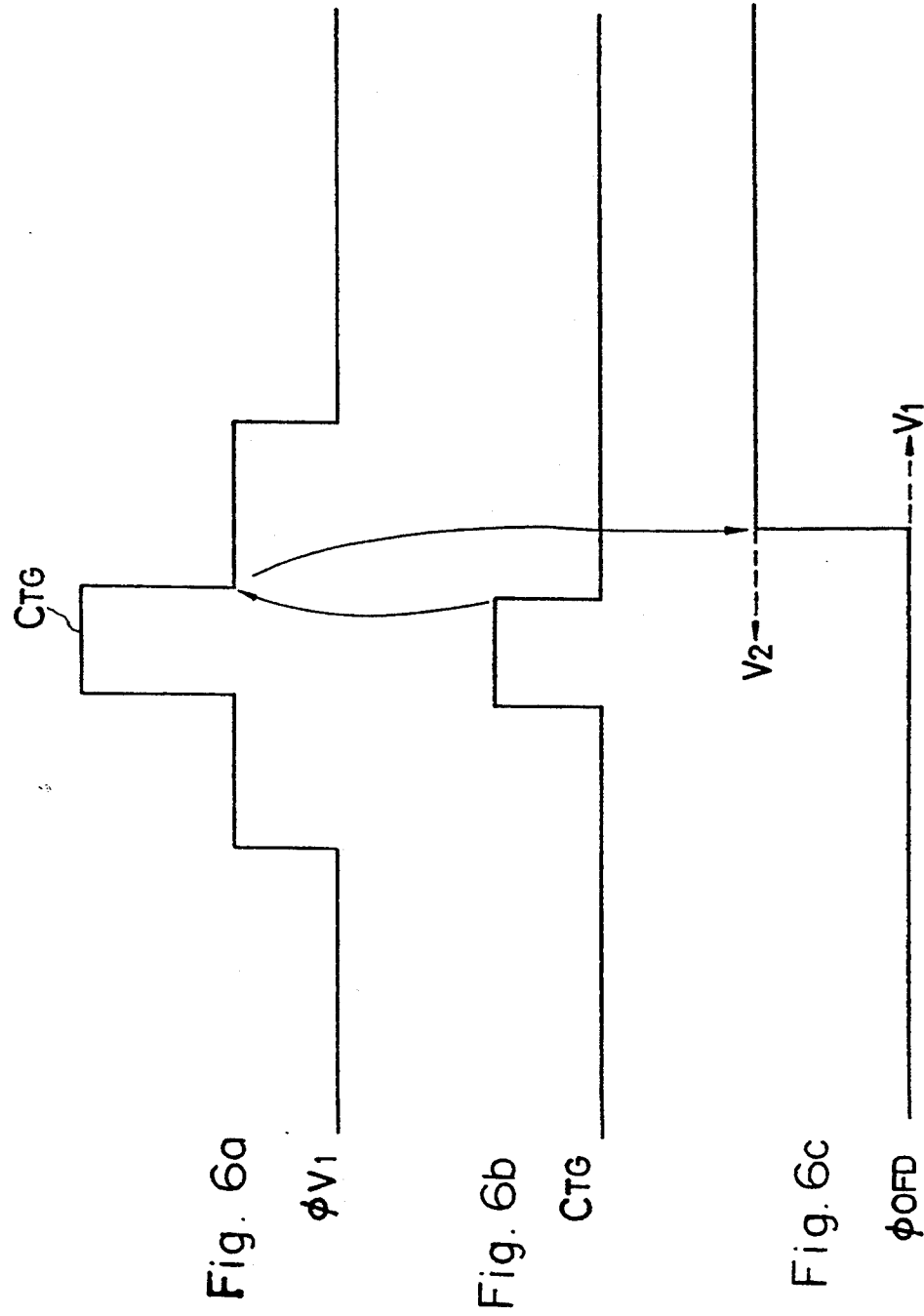

This will become clearer when the timing chart shown in FIG. 6 is referred to.

In FIG. 6, when the transfer clock signal CTG is input by the switch 13 (FIG. 6(b)), the driver 12 sets the level of the clock signals ΦV1~ΦV4 which are produced in accordance with the clock signals V1~V4 from the multiplexer 11 in the period corresponding to the transfer clock signal CTG to be the highest level (FIG. 6(a)). As result, the charges of the photo diodes 31 are transferred to the vertical transfer CCD's 32, so that the accumulation of the charges (exposure) is finished. After the transfer is finished, the voltage is switched from V1 to V2 (FIG. 6(c)).

The voltage V1 (V2) is supplied to the VOD 38 as the VSUB.

Figure 7:
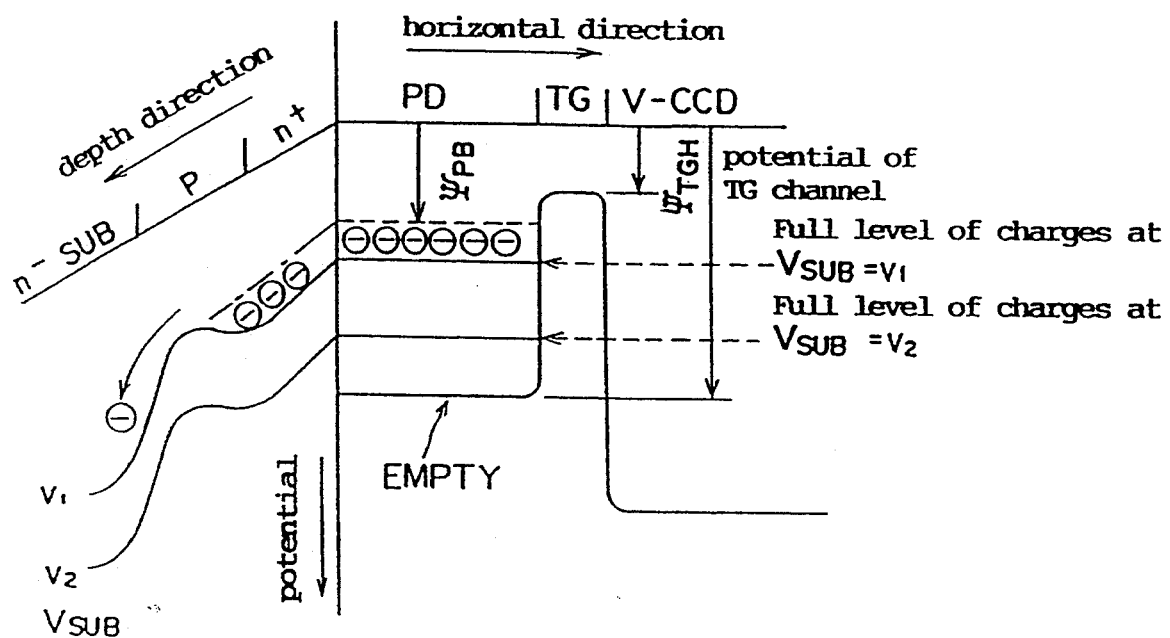
FIG. 7 is a schematic sectional view showing the operation of a CCD image pick-up device.

As can be seen in FIG. 7, when the voltage VSUB is changed to a higher voltage V2, the photo diodes 31, the N-substrate on the gates ΦOFD and the P-well (FIG. 3) are emptied to have a decreased potential well. Consequently, the accumulation capacitance of the charges of the photo diodes 31 is reduced. As a result, even if relatively strong light is incident, the charges generated thereby in the photo diodes 31 are swept from the gates ΦOFD into the N-substrate 51, so that no charge overflows into the vertical transfer CCD's 32. Namely, no blooming occurs.

If the switching of the voltage from V1 to V2 is carried out before the transfer clock signal CTG is output, the signals to be recorded disappear. Therefore, the switching of the voltage should be effected after the completion of the output of the transfer clock signal CTG.

When the diaphragm 2 is completely closed, the voltage VSUB is changed again to a lower value of V1 (FIG. 5(e) and (k)). Thereafter, the charges accumulated during the period Tv are read to be recorded on the magnetic disc 5 (FIG. 5 (d), (f), (g), (h) and (i)).

Figure 8:
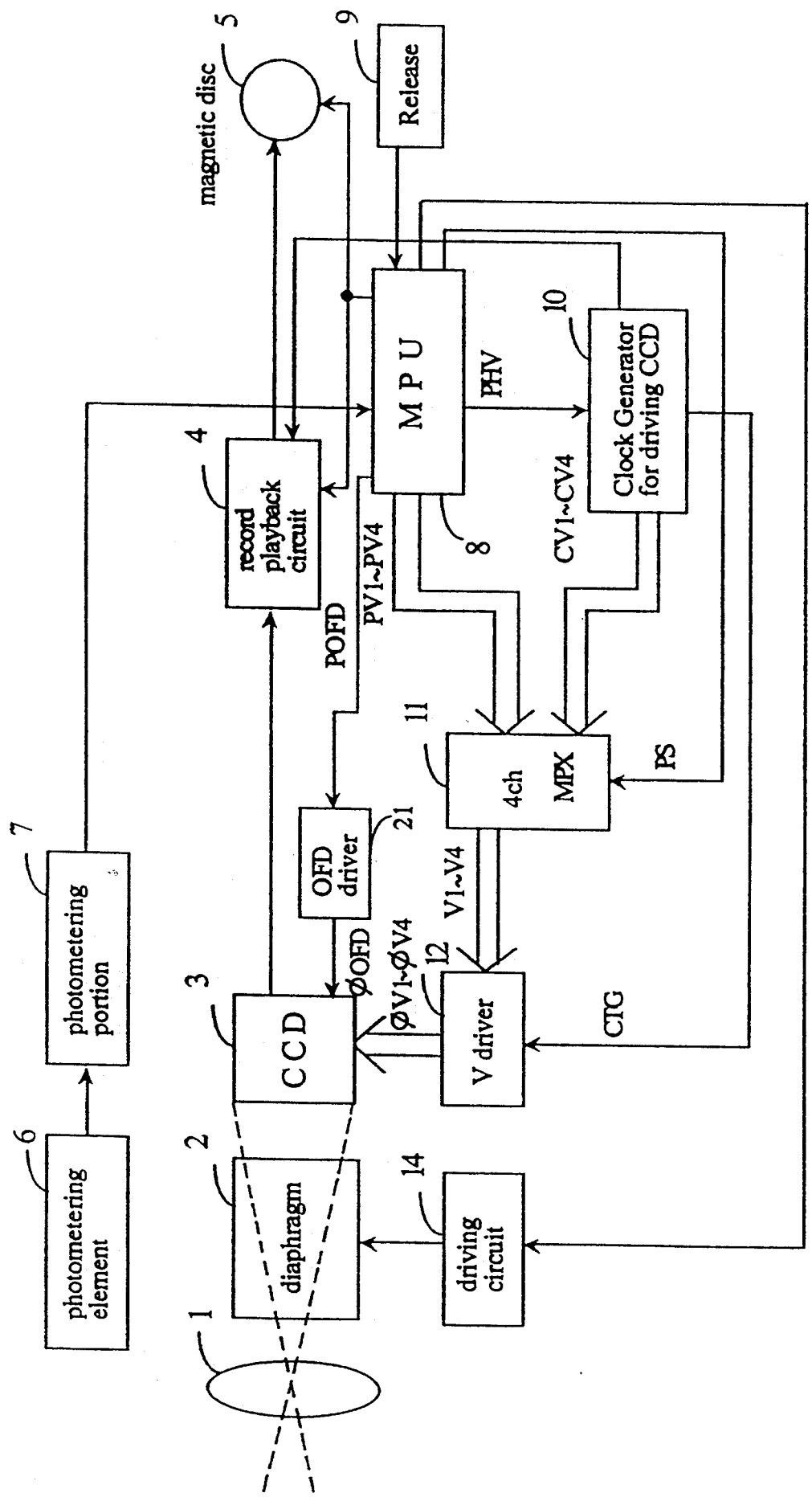
FIG. 8 is a block diagram of main components of an electronic still camera having an image pick-up device driving apparatus, according to another embodiment of the present invention.

FIG. 8 shows a driving apparatus of an image pick-up device according to another embodiment of the present invention. In FIG. 8, the components corresponding to those shown in FIG. 1 are designated with the same reference numerals.

In FIG. 8, the clock signal CTG generated by the clock generator 10 is directly supplied to the driver 12 without through the switch 13 shown in FIG. 1. The CCD 3 used in this embodiment is constructed so that when the voltage VSUB is set to be V2, the charges accumulated in the photo diodes 31 are completely swept toward the substrate 51. The other construction of the embodiment shown in FIG. 8 is same as that of the first embodiment shown in FIG. 1.

Figure 9:
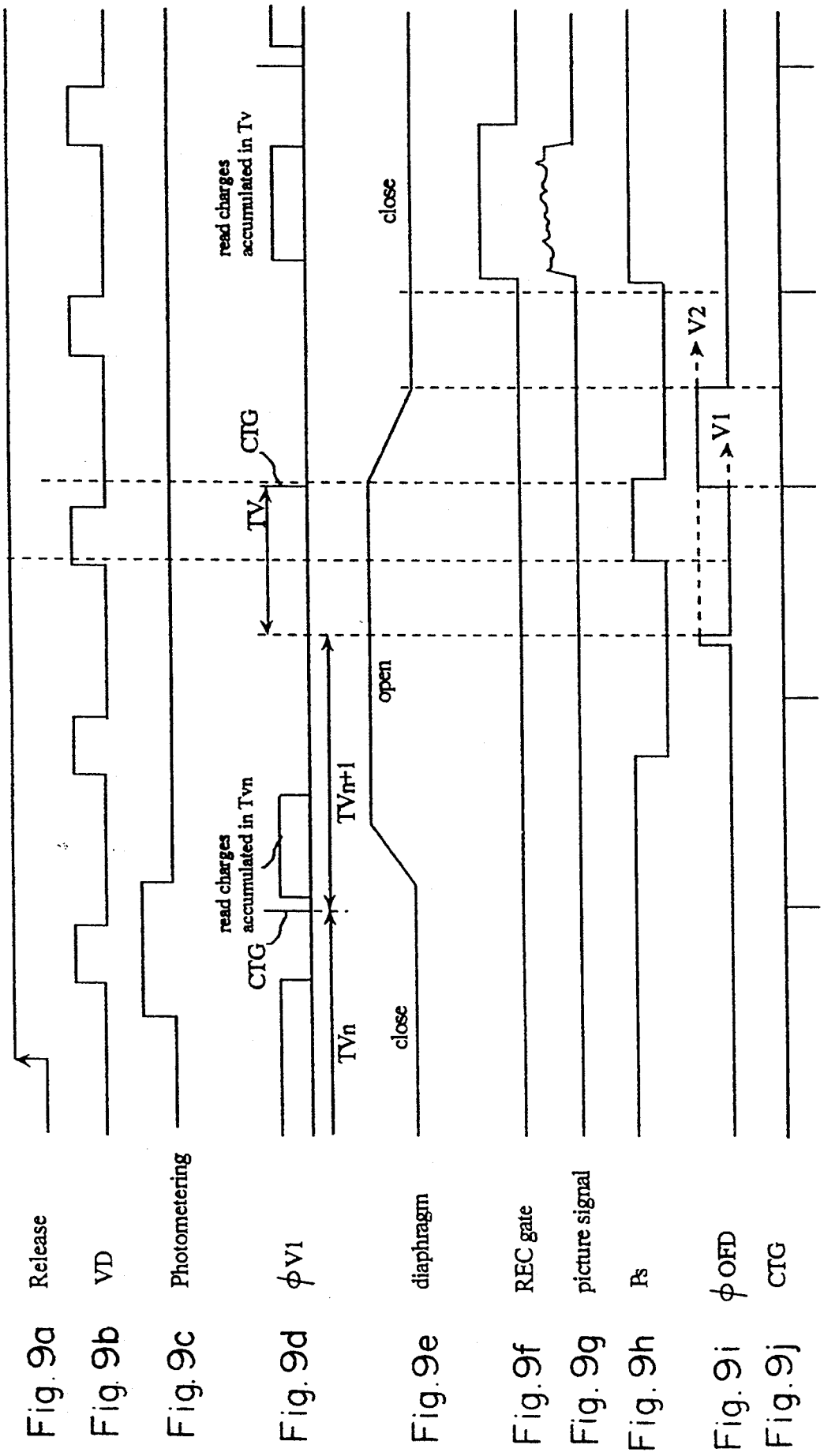
FIG. 9a–9j are a timing chart of operations of the main components of an electronic still camera shown in FIG. 8.

The operation of the second embodiment, shown in FIG. 8, is as follows (FIG. 9).

The operations where the unnecessary charges, accumulated during the period Tv and which are transferred to the vertical transfer CCD's 32 and swept after the release switch 9 is actuated, are the same as those in the first embodiment (FIGS. 9(a)~(e), (h) and (j)). Note, however, that the sweeping operation of the unnecessary charges is carried out by setting the voltage VSUB to V2, as will be described hereinafter.

Thereafter, in the second embodiment, the MPU 8 outputs the signal POFD, instead of the issuance of the transfer clock signal PTG immediately before the shutter operates, so that the driver 21 instantaneously sets the signal ΦOFD to be V2 (high level), (FIG. 9(i)).

Figure 10:
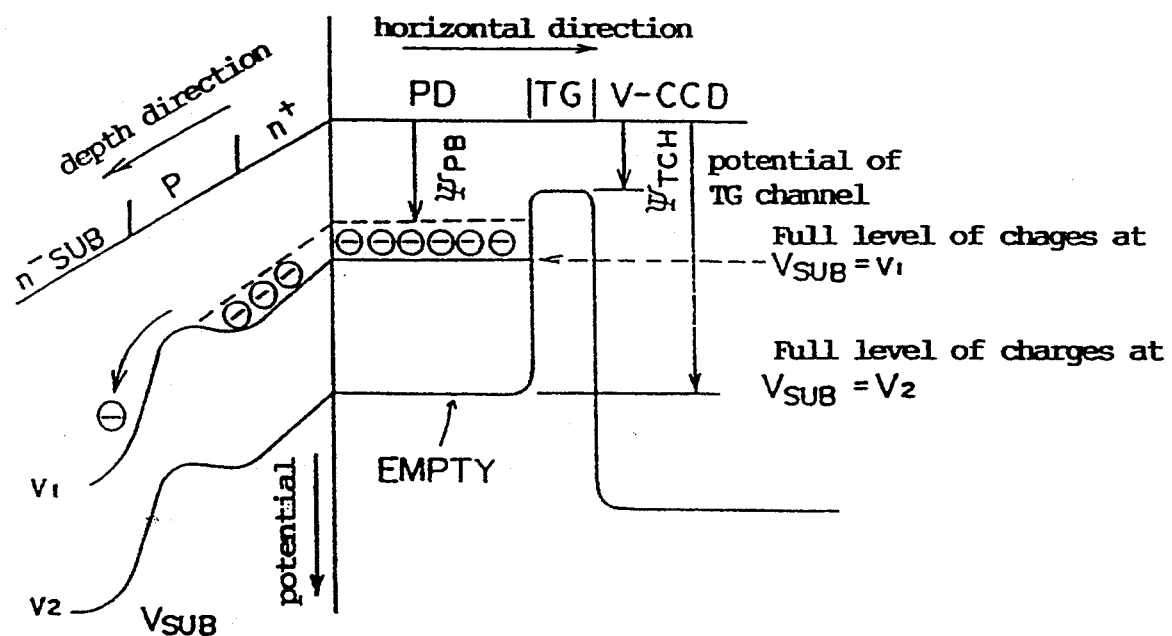
FIG. 10 is a schematic sectional view showing the operation of a CCD image pick-up device shown in FIG. 9.

In the second embodiment, as shown in FIG. 10, when the voltage VSUB is set to be V2, the charges accumulated in the photo diodes 31 are completely swept toward the substrate 51. As a result, only the charges corresponding to the quantity of object light made incident for the exposure time Tv are accumulated. Namely, this is equivalent to the operation when the electronic shutter operates only during the time Tv.

When the exposure time Tv lapses, the clock generator 10 produces the transfer clock signal CTG, so that the signal charges accumulated by the photo diodes 31 are transferred to the vertical transfer CCD's 32 to complete the exposure (FIG. 9(d)). After the transfer is finished, the diaphragm 2 is closed (FIG. 9(e)). Before the diaphragm 2 is closed after the completion of the transfer, the overflow signal ΦOFD is changed from V1 to V2 (FIG. 9(i)). Therefore, even if light is incident upon the photo diodes 31 before the diaphragm 2 is closed, the charges produced thereby are completely swept into the substrate 51.

The subsequent operations to read the signal charges accumulated during the exposure period Tv in order to record the read signal charges on the magnetic disc 5 are same as those shown in FIGS. 9(d), (f), (g) and (h).

The above discussion has been directed to the embodiments in which the image pick-up device to be driven is the CCD. The present invention can be applied to the drive of an image pick-up device other than the CCD.

As can be understood from the foregoing, according to the present invention, even if light is incident on the image pick-up device before the signals are read from the image pick-up device, the electrical charges accumulated by the charge accumulating device do not leak therefrom into the transfer elements, and accordingly, no blooming occurs.

I claim:

1. An image pick-up driving apparatus, comprising:
    an image pick-up device having a light receiving portion that converts an image of an object to be photographed into electrical charges to be accumulated, and a signal transfer portion that transfers said accumulated electrical charges;
    first means for controlling said image pick-up device by periodically issuing a first signal for transferring electrical charges accumulated in said light receiving portion to said signal transfer portion, said first controlling means issuing a second signal for starting an accumulation of electrical charges in said light receiving portion and for discharging unnecessary electrical charges accumulated in said signal transfer portion to a substrate; and
    second means for controlling said image pick-up device by issuing a third signal for discharging unnecessary electrical charges directly to said substrate over a period of time from when electrical charges accumulated in said light receiving portion are transferred to said transfer portion, in response to said first signal issued by said first controlling means, until a diaphragm associated with said image pick-up device is closed.

2. The image pick-up driving apparatus of claim 1, wherein said light receiving portion comprises a number of independent electrical charge accumulating elements in a matrix arrangement.

3. The image pick-up driving apparatus of claim 2, wherein said signal transfer portion comprises arrays of vertical transfer portions corresponding to rows of said electrical charge accumulating elements.

4. The image pick-up driving apparatus of claim 3, further comprising an integrated circuit substrate on which said independent electrical charge accumulating elements and said vertical transfer portions are formed.

5. The image pick-up driving apparatus of claim 1, further comprising a recorder for recording said accumulated electrical charges onto a recording medium.

6. The image pick-up driving apparatus of claim 5, wherein said recording medium comprises a magnetic disc.

7. The image pick-up driving apparatus of claim 1, further comprising means for driving said pick-up device.

8. The image pick-up driving apparatus of claim 7, wherein said driving means outputs an accumulation signal for accumulating said electrical charges into said light receiving portion.

* * * * *